United States Patent [19]

Takahashi

[11] 4,044,647
[45] Aug. 30, 1977

[54] SPREADABLE ANCHOR ASSEMBLY

[76] Inventor: Kenryu Takahashi, 3-go, 22-ban, 1-chome, Tokyo, Japan

[21] Appl. No.: 541,212

[22] Filed: Jan. 15, 1975

[30] Foreign Application Priority Data

Aug. 28, 1974  Japan .......................... 49-102236[U]

[51] Int. Cl.² ........................................... F16B 13/10
[52] U.S. Cl. ........................................ 85/72; 85/84
[58] Field of Search .................... 85/72, 84; 151/31

[56] References Cited

U.S. PATENT DOCUMENTS

| 1,418,524 | 6/1922  | Bronson   | 85/84 X |
| 2,438,533 | 3/1948  | Booth     | 85/84   |
| 2,707,897 | 5/1955  | Beeson    | 85/83   |
| 2,727,276 | 12/1955 | Nelson    | 151/31  |
| 3,042,094 | 7/1962  | Liljeberg | 151/31  |
| 3,232,161 | 2/1966  | Fernberg  | 85/72   |
| 3,641,866 | 2/1972  | Mortensen | 85/72   |
| 3,765,295 | 10/1973 | Ptaic     | 85/83 X |
| 3,803,791 | 4/1974  | Turnbull et al. | 85/83 |

FOREIGN PATENT DOCUMENTS

| 1,156,476 | 12/1957 | France | 85/84 |
| 1,528,496 | 4/1968  | France | 85/84 |
| 472,423   | 2/1929  | Germany | 85/84 |
| 886,997   | 1/1962  | United Kingdom | 85/84 |
| 1,218,275 | 1/1971  | United Kingdom | 85/72 |

Primary Examiner—Roy D. Frazier
Assistant Examiner—Thomas J. Holko
Attorney, Agent, or Firm—Steinberg & Blake

[57] ABSTRACT

The present invention provides a spreadable anchor assembly comprising a plural leg flange nut with a perforated cap carrying a driven spreader, the cap being made of thick paper and having centrally a perforated circular line inside the top opening of the flange nut, the top of the spreader adhering to the lower side of the cap.

8 Claims, 5 Drawing Figures

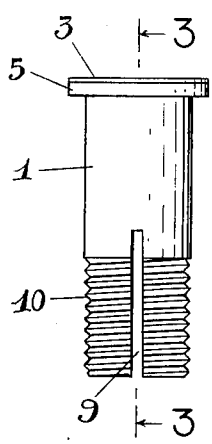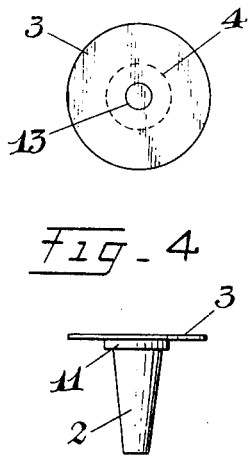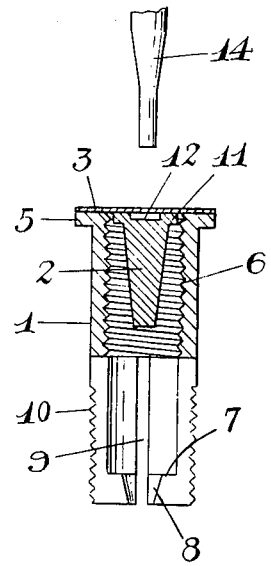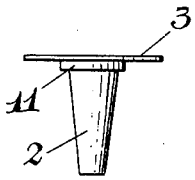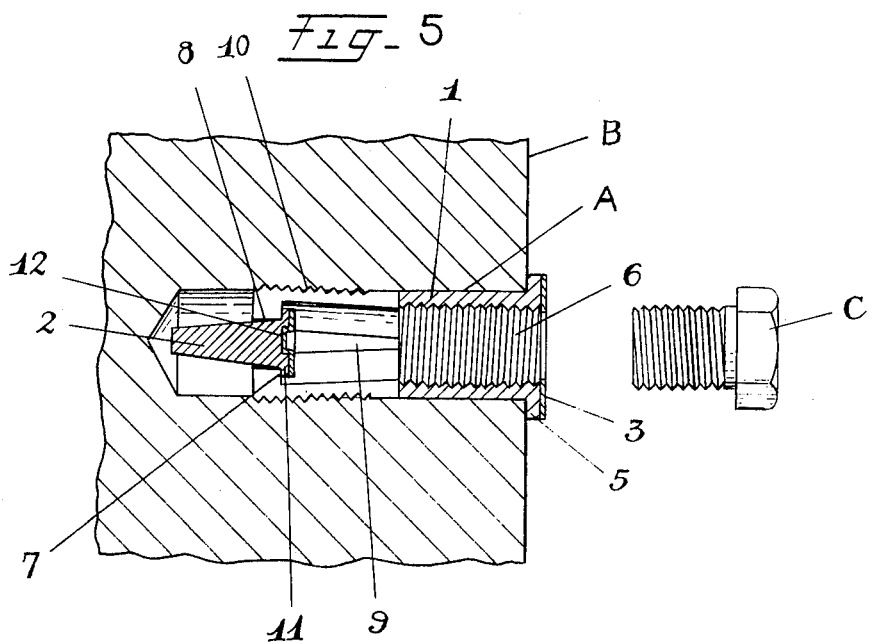

SPREADABLE ANCHOR ASSEMBLY

BACKGROUND OF THE INVENTION

1. Field of the Invention

The anchor of the present invention belongs to U.S. Cl. 85/32.1, 45, 26; 151/14, 44; namely flanged coupling nuts, driving contacts screws, and point spreaders locking nails; side locked nut, thread lock coupled nut and bolt.

2. Description of the Prior Art

Generally the expandable anchor embedding its legs into the hole surface of a wall by a spreader is kept separate from the spreader as shown for example my pending U.s. patent application Ser. No. 444,877 filed Feb. 22, 1974, titled "TOEING FLANGE NUT", and consequently without the facility of driving the spreader as a separate part especially at a building site.

On the contrary the spreadable anchor assembly of the present invention provides a support in the form of a capped flange nut containing a spreader therein as one set so that it is very easy for a field worker to mount the anchor of the present invention.

SUMMARY OF THE INVENTION

The present invention provides a spreadable anchor assembly comprising a plural leg flanged nut with a perforated cap having a driven spreader adhered thereto; the cap being made of thick paper and having centrally a perforated circular line inside the top opening of the nut; the top of the spreader being adhered to the lower side of the cap. With considerable facility a set which includes the flange nut and spreader contained therein can be used by punching out the cap at a center mark, the hanging spreader being directly driven to spread the flange legs out to be pressed against the wall, without any trouble of holding and inserting the spreader by the field worker.

BRIEF DESCRIPTION OF THE DRAWING

FIG. 1 is a front elevation of a flange nut of the present invention.

FIG. 2 is a top plan view of the flange nut thereof.

FIG. 3 shows under a punch a section along the lines 3-3 of FIG. 1.

FIG. 4 is a front elevation of a driven cap spreader of the present invention.

FIG. 5 is a cross-section of the anchoring flange nut of the present invention embedded in the wall for securing or adjusting a bolt.

DESCRIPTION OF THE PREFERRED EMBODIMENTS

The anchoring flange nut of the present invention will be described in more detail in connection with a preferred embodiment.

The cap flange nut of the present invention comprises a flange nut 1, a driven spreader 2 and a cap lid 3. The cap lid 3 is made of thick paper. The cap lid 3 is adhered on the top of the flange nut 1. The driven spreader 2 is hung from the cap lid 3 centrally by sticking thereto.

A perforated circular line 4 is centrally made through the cap lid 3.

A flange 5 is formed at the top of the nut 1.

A screw thread 6 is formed at the inner upper part of the nut 1.

A stepped part 7 is provided at the inner lowest part of the nut 1.

A tapered hole 8 is formed at the bottom of the nut 1.

Slits 9 are formed from one end of and in parallel with the axis of the nut 1.

An outer screw thread 10 is formed at the lower part of the nut 1.

A stop rim 11 is peripherally made at the top of the driven spreader 2, which is situated beneath and adhered to the cap lid 3.

An indentation 12 is formed on the top of the spreader 2 beneath a mark 13 on the cap lid 3 for a punch 14.

To explain usage of the anchoring flange nut in accordance with FIGS. 3 and 5, a side cavity A is made on a wall B firstly, the flange nut being fitted into the cavity A secondarily, the punch 14 punching the center of the cap lid 3 out to drive the spreader 2 into the hole 8 to spread the outer screw threads 10 out to fix into the wall B with stopping of the rim 11 at the stepped part 7 of the nut 1 thirdly.

Finally such a support having an external screw thread as a bolt C will be secured into the nut embedded solidly in the wall B.

It will thus be seen that according to the invention the spreadable anchor assembly includes the elongated tubular sleeve 1 which has opposed open ends at the region of one of which the sleeve 1 is formed with the interior threads 6 while at the region of its opposite end the sleeve 1 is formed with the longitudinal slits 9 forming the spreadable legs of the anchoring sleeve 1. At its one end where the thread 6 is located the open end of the sleeve 1 is closed by a cap 3 in the form of a sheet material, such as paper, which can be easily ruptured, the tapered spreader element 2 being situated in the interior of the sleeve 1 and initially adhering to the inner surface of the sheet material 3. At its end which is formed with the longitudinal slits 9 the sleeve 1 has the inwardly extending flanges 7 formed with the tapered opening 8 which cooperates with the tapered spreader element 2 when the latter is driven by the punch 14 to the position shown in FIG. 5, with the sheet material 3 of course rupturing along the circular line of perforations 4, these perforations having a diameter corresponding to the outer diameter of the lip 11 of the spreader element 2 and the circle along which the perforations 4 extend of course being smaller than the inner diameter of the sleeve 1 and the end to which the cap 3 is adhered, this end having the flange 5 which limits the inward movement of the sleeve 1 into the cavity in the wall.

As many embodiments of the present invention may be made without departing from the spirit and scope thereof, it is to be understood that the invention includes all such modifications and variations as come within the scope of the appended claim.

What I claim is:

1. A spreadable anchor assembly, adapted to be fixed to an opening of a wall or the like, comprising an elongated tubular sleeve having opposed open ends and being formed with inner threads at the region of one of said open ends while being formed with longitudinally extending slits extending along said sleeve from the other of the open ends thereof to define spreadable legs between said slits, said sleeve being formed with an inner tapered opening at the region of said spreadable legs thereof and having adhered to said one open end in a position extending across and closing said one open end of said sleeve a cap of easily ruptured sheet material which has an inner surface directed toward the other open end of said sleeve, and an elongated tapered spreader element adhered to said cap at said inner surface thereof and situated in the interior of said sleeve, so that a punch may be applied to said cap to rupture the latter while driving said spreader element into the inner tapered opening of said sleeve to spread said legs thereof outwardly into engagement with the surface of an opening which is formed in a wall or the like for anchoring said sleeve thereto, the rupturing of said cap and the driving of said spreader element into the tapered opening to spread said legs uncovering the inner threads so that a screw may be received therein.

2. The combination of claim 1 and wherein said cap is made of paper.

3. The combination of claim 1 and wherein said cap is formed with a line of perforations extending along a circle the diameter of which is smaller than the inner diameter of the sleeve.

4. The combination of claim 1 and wherein said sleeve is formed at said other end thereof with inwardly extending flanges separated by said slits and defining said tapered opening for receiving said spreader element.

5. The combination of claim 4 and wherein said spreader element has at its end which initially is adhered to said cap a lip for engaging said flanges at said other end of said sleeve.

6. The combination of claim 1 and wherein said sleeve is formed at said one end thereof with an outwardly extending flange for limiting the movement of the sleeve into an opening in a wall or the like and for increasing the area of engagement between said sleeve and cap.

7. The combination of claim 1 and wherein said spreader element is formed at its end which is adhered to said inner surface of said cap with an indentation for receiving an end of a punch and said cap having an outer surface formed with a central mark aligned with said indentation for indicating the place at said cap to which the end of a punch is to be applied.

8. The combination of claim 1 and wherein said sleeve is formed at the exterior of said legs thereof with threads to be pressed into the surface of an opening in a wall or the like when the legs are spread apart from each other.

* * * * *